United States Patent [19]

Skjeltorp

[11] Patent Number: 4,846,988

[45] Date of Patent: Jul. 11, 1989

[54] METHOD AND DEVICE FOR BRINGING BODIES IMMERSED IN LIQUID TO FORM REGULAR STRUCTURAL PATTERNS

[76] Inventor: Arne T. Skjeltorp, Dagboveien 11, 1400 Ski, Norway

[21] Appl. No.: 132,668

[22] Filed: Dec. 10, 1987

Related U.S. Application Data

[63] Continuation of Ser. No. 35,228, Apr. 6, 1987, abandoned, which is a continuation of Ser. No. 756,433, filed as PCT NO84/00050 on Nov. 8, 1984, published as WO85/02286 on May 23, 1985, abandoned.

[30] Foreign Application Priority Data

Nov. 11, 1983 [NO] Norway .................................. 834118

[51] Int. Cl.⁴ ........................ C09K 5/00; G01N 27/00; H01F 1/00
[52] U.S. Cl. ............................ 252/62.52; 252/62.53; 252/62.54
[58] Field of Search ................ 252/62.52., 62.53, 62.54

[56] References Cited

U.S. PATENT DOCUMENTS

| | | | |
|---|---|---|---|
| 3,981,844 | 9/1976 | Romankiw | 252/62.52 |
| 4,006,479 | 2/1977 | LaCombe | 252/62.53 |
| 4,100,088 | 7/1978 | Haas et al. | 252/62.52 |
| 4,114,956 | 9/1978 | Jennings, Jr. | 252/62.53 |
| 4,278,556 | 7/1981 | Tada | 252/62.53 |
| 4,381,244 | 4/1983 | Berkowitz et al. | 252/62.52 |

FOREIGN PATENT DOCUMENTS

| | | | |
|---|---|---|---|
| 44579 | 4/1976 | Japan | 252/62.52 |
| 14193 | 2/1979 | Japan | 252/62.52 |
| 649657 | 2/1979 | U.S.S.R. | 252/62.52 |

OTHER PUBLICATIONS

Kaiser et al., "Some Application of Ferrofluid Magnetic Colloids", IEEE Transactions on Magnetics, vol. Mag-6, No. 3, pp. 694–698, Sep. 1970.

Primary Examiner—H. M. S. Sneed
Assistant Examiner—Chung Pak
Attorney, Agent, or Firm—Watson, Cole, Grindle & Watson

[57] ABSTRACT

Method and device for bringing bodies immersed in liquid to form regular structural patterns which may influence electromagnetic and acoustic waves, simulate states and processes in atomic or molecular structures and the like. This is achieved by means of a great number of non-magnetic, essentially monodisperse particles dispersed in a magnetic liquid, which is subjected to an essentially homogeneous magnetic field. Each of the dispersed non-magnetic particle bodies then assumes a magnetic moment corresponding to the volume of liquid displaced by the body, but inversely directed. Magnetic interaction forces would then prevail between the particle bodies, which thus may be collectively controlled by the external magnetic field to assume various suitable structural patterns.

17 Claims, 2 Drawing Sheets

METHOD AND DEVICE FOR BRINGING BODIES IMMERSED IN LIQUID TO FORM REGULAR STRUCTURAL PATTERNS

This application is a continuation of application Ser. No. 035,228, filed Apr. 6, 1987, now abandoned, which is a continuation of application Ser. No. 756,433, filed as PCT NO84/00050 on Nov. 8, 1984, published as WO85/02286 on May 23, 1985, now abandoned.

BACKGROUND OF THE INVENTION

1. Field of the Invention

The present invention relates to a method and a device for bringing bodies immersed in liquid to form regular structural patterns which may purposefully affect electromagnetic or acoustic waves, simulate features of atomic or molecular structures or the like.

2. The Prior Art

Dispersion of colloidal magnetic particles in a non-magnetic liquid have been used for studying various crystallization phenomena. However, a drawback has been that each such magnetic particle preferably should include only one single magnetic domain, and as such the particles must be extremely minute (order of magnitude of 0,01 $\mu$m). Larger particles having more than one doman do not behave homogeneously in a magnetic field, and consequently do not form a monodisperse particle assembly.

SUMMARY OF THE INVENTION

Thus, it is an object of the present invention to overcome this drawback, and the noted is achieved by a method as indicated above which has the unique feature that a great number of non-magnetic, essentially monodisperse particle bodies are dispersed in a magnetic liquid, which then is exposed to an essentially homogeneous magnetic field.

The invention also comprises a device adapted for carrying out this method and thus a unique inventive feature comprises a volume of magnetic liquid in which are dispersed a great number of non-magnetic, essentially monodisperse particle bodies, and magnetizing means for exposing the liquid with the dispersed particles to an essentially homogeneous magnetic field.

Even though the dispersed particle bodies per se are non-magnetic, such a body would, when immersed in a magnetic liquid exposed to a magnetic field, assume a magnetic moment equal to the magnetic moment of the liquid volume displaced by the body, but inversely directed. These circumstances are analogous to the principle of Archimedes for a body submerged in a liquid and exposed to gravitation. The body then assumes a buoyancy corresponding to the gravitational force acting on the displaced liquid volume, but directed in the opposite sense.

Thus, the dispersed particle bodies form magnetic "holes" in the magnetic liquid, and may then be considered analogously to the known electric holes in a semiconductor. Such holes in a magnetic liquid would then, as indicated above, under the influence of a magnetic field, exhibit a magnetic moment. Holes of the same size and shape are in the present connection of particular interest, as they represent a system of numerous bodies in mutual dipole interaction, which may be readily varied by means of a variable external field. This provides extended possibilities for creating regular structural patterns for the above purposes, controllable by an external magnetic field.

A magnetic liquid or ferrofluid consists of a colloidal suspension of minute ferromagnetic monodomain particles in a non-magnetic carrier liquid. A typical such magnetic liquid may consist of some volume percents of magnetite particles ($Fe_3O_4$) having a mean size of about 0,01 $\mu$m in kerosene as carrier liquid. Surfactants covering the particles prevent agglomeration, and because of the minute particle size, Brownian motion prevents sedimentation in a gravitational or magnetic field. The particles behave like classical dipoles and the liquid is so-called ideally paramagnetic, as it is only magnetic in an external field. Immersion of non-magnetic bodies in such magnetic liquid has so far only been used for separation of different materials in a non-homogeneous external magnetic field, which causes a variation of the magnetic pressure or force exerted by the liquid on immersed bodies of differing shape and weight.

In accordance with the present invention, however, homogeneous external magnetic fields do used, which are not exert direct forces on the dispersed non-magnetic bodies, but rather produce indirect interactions between the different bodies, which then are mutually stabilized in regular structural patterns corresponding to a minimization of the total energy of the system. If such an immersed body is anisotropic, a torque acts on the body in order to bring it by rotation to a stable state corresponding to minimum energy of the body. Ellipsoid bodies are thus adjusted to a position with the longer ellipsoid axis in the direction of the applied magnetic field. With a rotation of the homogeneous external magnetic field, regular structural patterns of monodisperse anisotropic bodies would then exhibit a collective rotation. By means of an appropriate variation of the external magnetic field as to intensity and direction, such structural patterns may be modulated in time and space. This may be utilized for simulating various states and processes in atomic and molecular structures, in particular phase transitions and surface phenomena.

With appropriate influence from the external magnetic field the non-magnetic particles may be made to form microscopic and macroscopic structural patterns, which may be utilized for monochromatization, filtering, rotation, polarization, etc., of different types of acoustic and electromagnetic waves. Prior art apparatus for this purpose have the drawback that their range of application is restricted to predetermined wavelengths, with only meagre possibilities for modulation in time and space. The present formation of structural patterns according to the invention provides, however, extends the possibilities for simplified manipulation of different wave types, particularly microwaves in the mm range, and at the same time the formed structural patterns may be modulated in time and space. As indicated above, this may be achieved by creating in a magnetic liquid cavities of identical size and form by means of monodisperse non-magnetic bodies which are collectively controllable for forming various suitable structural patterns by magnetizing the liquid surrounding the particles. The concept "monodisperse bodies" implies that a great number of bodies have essentially identical size and form. The applied particle bodies according to the invention are preferably made of plastic material, in particular polystyrene, and have a size in the range 1–20 $\mu$m. The required dispersed magnetic holes may, however, in principle be formed by any type of homogeneous, clearly defined bodies, possibly also in fluid form. As completely non-magnetic particle bodies are used, the drawback mentioned above as to particles having more than one domain in earlier systems, is completely eliminated.

The invention is now to be explained in more detail by means of exemplary embodiments with reference to the accompanying drawings.

DETAILED DESCRIPTION OF THE PREFERRED EMBODIMENT

Figure 1:
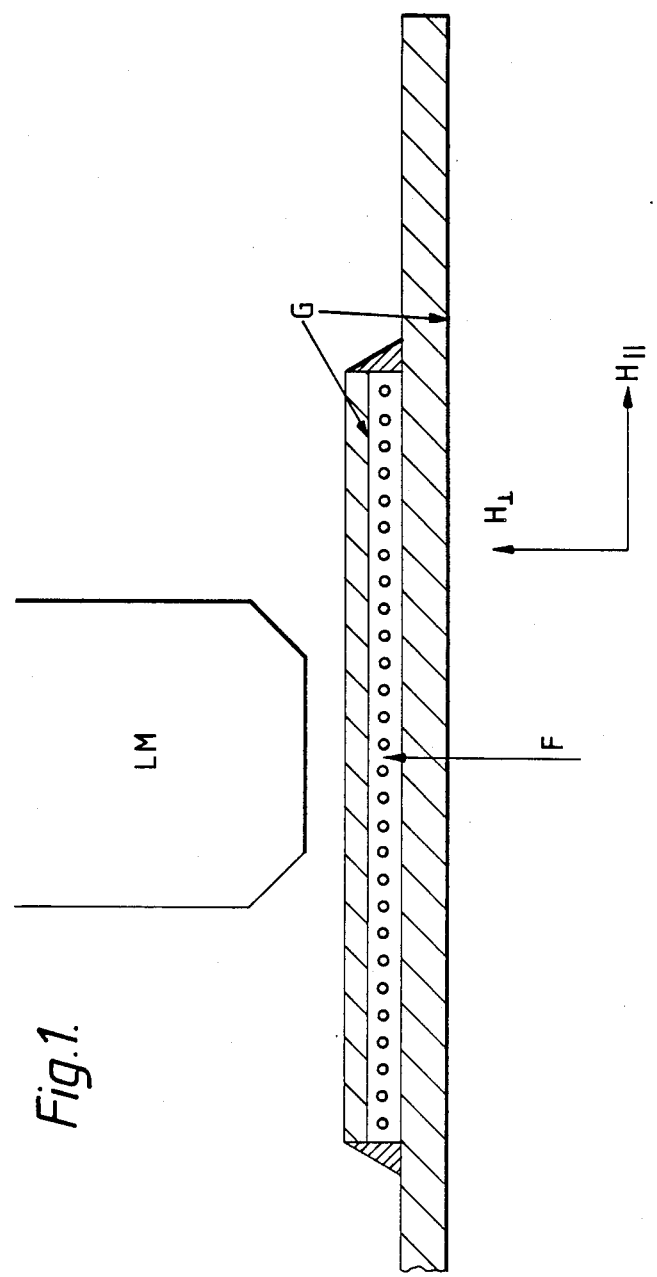
FIG. 1 shows a device for direct microscopic observation of created structural patterns of non-magnetic spheroid particle bodies in a magnetic liquid according to a preferred embodiment of the present invention.

A practical arrangement illustrating the collective behaviour of monodisperse spheres in a magnetic liquid is shown in FIG. 1.

A thin layer or liquid film F of magnetic liquid is confined in an interspace between plane parallel glass plates G. Monodisperse polystyrene spheres are dispersed in this liquid. For the experiments to be reported here a magnetic liquid consisting of kerosene with dispersed magnetic microparticles was chosen.

The saturation magnetization $M_s$ for this liquid is 400 Gauss and the initial susceptibility of the liquid with low magnetic fields H is $X=0,17$, so that the magnetization would be $M=XH$. The diameter of the spheres is 9,6 µm and the liquid layer thickness is approximately 15 µm. The liquid layer is disposed to be subjected to an external homogeneous magnetic field both normally ($H_\perp$) and in parallel ($H_{||}$). The spheres may be observed by means of a light microscope LM with transmitted light. The typical structural patterns formed by the spheres under the influence of various magnetic fields will now be further described.

With a magnetic field parallel to the liquid layer (e.g. $H_{||} = 100$ O$\rho$) different particle phases are formed depending on the concentration of the particle bodies:

(1) a "gas-like" phase with low concentration, in which isolated or paired spheres occur, (2) a "liquid-like" phase with medium particle density, in which the spheres are forming chains signifying attractive interactions between the spheres and repulsive interactions between the various chains, (3) a "solid-like" phase with high particle density.

With a magnetic field normal to the liquid layer (e.g., 50 O$\rho$) a regular triangular structure is formed, in which the distance between the spheres is determined by the particle concentration. This shows that repulsive forces are acting between the spheres.

An evaluation of the fundamental interaction forces producing the above structural patterns will now be made.

Figure 2:
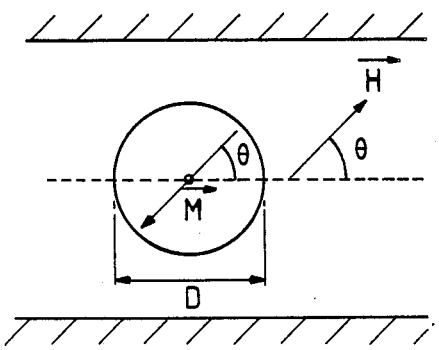
FIG. 2 shows the prevailing situation for one single isolated spheroid particle body in the device of FIG. 1.

FIG. 2 shows schematically the prevailing situation for a single sphere with diameter D in a magnetic liquid. The sphere displaces a certain liquid volume and forms a magnetic hole having a volume $V=\pi D^3/6$. With an applied external magnetic field $H(\theta)$ forming an angle $\theta$ with the liquid layer plane, the magnetic moment $M_\nu(\theta)$ corresponding to the formed magnetic hole is equal to the moment of the displaced liquid, but directed opposite and given by:

$$\vec{M}_\nu(\theta) = -X_{eff}(\theta)V\vec{H}(\theta) \quad (1)$$

A linear medium is assumed and the effective susceptibility per volume unit of the liquid, $X_{eff}(\theta)$ is then given to first order by the equation:

$$X_{eff}(\theta)=X/[1+(N_F(\theta)-4\pi)/3X] \quad (2)$$

Here, X is the bulk susceptibility per volume unit, $N_F(\theta)$ the demagnetization factor of the liquid layer and $4\pi/3$ the demagnetization factor of a sphere. With a magnetic field normal to the liquid layer, $N_F(\theta)=N_F(90°)=4\pi$, whereas a parallel field gives $N_F(\theta)=N_F(0°)=0$.

With two spheres separated by a distance a from center to center an effective dipolar interaction energy is present, which to first order is given by:

$$E(\theta)=[M_\nu(\theta)]^2(1-3\cos^2\theta)/a^3 \quad (3)$$

Figure 3:
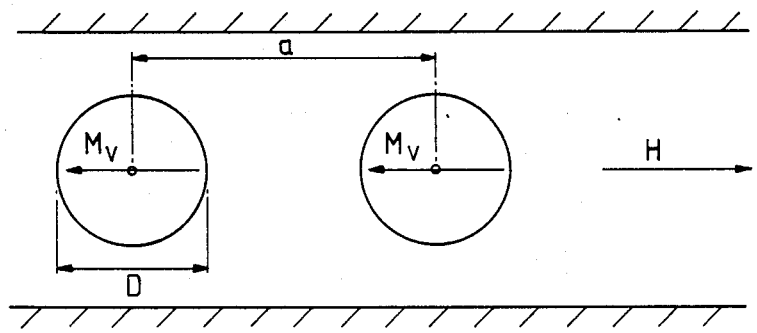
FIG. 3 shows the interaction between a pair of spheroid particle bodies in a homogeneous magnetic field parallel to the liquid layer shown in FIG. 1.

With a field parallel to the liquid layer, as indicated in FIG. 3, equation (3) is reduced to:

$$E(0°)=-2[M_\nu(0°)]^2/a^3 \quad (4)$$

and an attractive force would prevail between the different spheres or the cavities formed in the magnetic liquid, and the spheres would then form chain systems. The chains thus formed, may to first order be considered as elongated dipole rods and repulsive forces would reign between such rods, which then would form regular parallel structural patterns, in which the distance between the rods is determined by the concentration of the spheres in the liquid.

The chains of spheres follow the magnetic field lines, which implies that the present device also may be used for direct visual display and mapping of the magnetic field around a magnet system.

Figure 4:
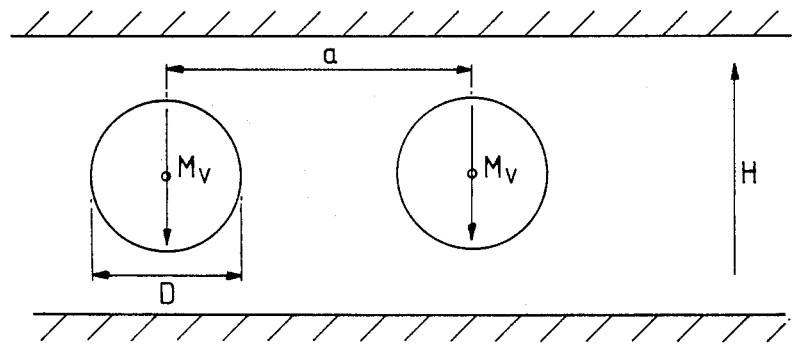
FIG. 4 illustrates the same conditions as in FIG. 3, but with a magnetic field normal to the liquid layer.

With a magnetic field normal to the liquid layer, as indicated in FIG. 4, repulsive forces would act between the various spheres with an interaction energy given by the equation:

$$E(90°)=[M_\nu(90°)]^2/a^3 \quad (5)$$

This would produce regular triangular patterns among the spheres dispersed in the liquid on certain conditions which are further discussed below.

The equations (1)–(5) give a description of the present system to first order. For more accurate calculations numeric analysis would be required, applying, e.g., the element method.

To indicate the thermal stability of the lattice structures produced, a dimensionless parameter may be introduced as the ratio between the dipolar energy and the thermal energy:

$$\Gamma_d(\theta)=[M_\nu(\theta)]^2/a^3 k_B T \quad (6)$$

Here $M_\nu(\theta)$ is given by the equation (1), T is the absolute temperature and $k_B$ is Boltzmann's constant. $\Gamma_d(\theta)$ is an expression of the degree of order prevailing in the system of spheres, and when this value is below a certain critical magnitude, the Brownian motion would dominate to such extent that the regular lattice pattern presumably would be broken down to an irregular mass of particles. The critical values of the parameter $\Gamma_d(\theta)$ are not to be known on the basis of calculations to first order. Numeric simulations of such a two-dimensional model system of mutually repulsive dipoles have, however, been made. Such simulations indicate that regular structures may be formed at a value of $\Gamma(90°)=62\pm3$. This is in reasonable accordance with observations made on the illustrated system of spheres, which confirms the validity of the above description of the system.

With a rotation of the magnetic field from a direction parallel to the liquid layer to a direction normal to the same, a transition was observed from a quasi one-dimensional to a quasi two-dimensional lattice. This transition takes place at approximately $\theta=70°$, where the linear chains of spheres are beginning to break up and thereafter tend to form triangular lattice pattern. By means of the present simple arrangement a phase transition in a crystal lattice may thus be simulated. It should be noted that the parallel plates G in FIG. 1 form an interspace therebetween and are spaced apart a distance that ranges from the largest dimension of the particle bodies in the magnetic liquid therebetween to double the largest dimension. The plates G also have substantially greater surface dimensions than the thickness of the interspace therebetween.

I claim:

1. A method of providing a regular, structural pattern of particles in a liquid, the method consisting essentially of the steps of (a) dispersing a plurality of non-magnetic, monodisperse particles having uniform sizes and shapes in a magnetic liquid confined in an interspace between two surfaces which are spaced apart a distance that ranges from a largest dimension of said particles to double said largest dimension, said particles creating non-magnetic cavites within said magnetic liquid which have identical sizes and shapes, and (2) applying a substantially homogeneous magnetic field to said magnetic liquid and said particles in said interspace from a certain direction so that said particles will move within said magnetic liquid in said interspace to form a regular, structural pattern within said magnetic liquid in said interspace.

2. A method as claimed in claim 1, including the step of changing the direction from which said substantially homogeneous magnetic field is applied to said magnetic liquid and said particles therein.

3. A method as claimed in claim 1, including the step of varying the intensity of said substantially homogeneous magnetic field applied to said magnetic liquid and said particles therein.

4. A method as claimed in claim 1, wherein said non-magnetic, monodisperse particles are spheroids.

5. A method as claimed in claim 4, wherein said non-magnetic, monodisperse particles are made of plastic.

6. A method as claimed in claim 5, wherein said regular, structural pattern is a triangular lattice.

7. The combination of a magnetic liquid having non-magnetic, monodisperse particles located in an interspace between two surfaces which are spaced apart a distance that ranges from an largest dimension of said particles to double said largest dimension and a device for forming the non-magnetic, monodisperse particles into a regular, structural pattern within said interspace, said particles consisting of non-magnetic, monodisperse particles having uniform sizes and shapes and said device including magnetizing means for applying a substantially homogeneous magnetic field to said magnetic liquid containing said particles in said interspace.

8. The combination as defined in claim 7, wherein said two surfaces comprise two parallel plates which have at least one surface dimension that is greater than the thickness dimension of said interspace.

9. The combination as defined in claim 8, wherein said magnetizing means includes means for varying the intensity of said substantially homogeneous magnetic field applied to the interspace between said two parallel plates and thus to the magnetic liquid and non-magnetic, monodisperse particles therein.

10. The combination as defined in claim 7, wherein said non-magnetic monodisperse particles are spheroids.

11. The combination as defined in claim 10, wherein said non-magnetic monodisperse particles are made of a plastic material.

12. The combination as defined in claim 11, wherein said plastic material is polystyrene.

13. The combination as defined in claim 10, wherein said particles have diameters between 1 and 20 $\mu$m.

14. The combination as defined in claim 7, wherein said magnetic liquid is a colloidal suspension of ferromagnetic monodomain particles in a non-magnetic carrier liquid.

15. The combination as defined in claim 14, wherein said non-magnetic carrier liquid is selected from the group consisting of kerosene and water.

16. The combination as defined in claim 14, wherein said ferromagnetic monodomain particles are substantially smaller than said non-magnetic, monodisperse particles.

17. The combination as defined in claim 16, wherein said ferromagnetic monodomain particles have a mean size of about 0.01 $\mu$m.

* * * * *